United States Patent
Gaffe et al.

(10) Patent No.: US 7,937,940 B2
(45) Date of Patent: May 10, 2011

(54) MASTER CYLINDER COMPRISING A RESUPPLY-PROMOTING SEAL

(75) Inventors: Francois Gaffe, Bondy (FR); Antony Auguste, Villier sur Marne (FR); Laurent Lhuillier, Le Blanc Mesnil (FR); Olivier Bernadat, Le Perreux (FR)

(73) Assignee: Robert Bosch GmbH, Stuttgart (DE)

( * ) Notice: Subject to any disclaimer, the term of this patent is extended or adjusted under 35 U.S.C. 154(b) by 534 days.

(21) Appl. No.: 12/124,646

(22) Filed: May 21, 2008

(65) Prior Publication Data

US 2008/0289329 A1 Nov. 27, 2008

(30) Foreign Application Priority Data

May 21, 2007 (FR) ...................................... 07 03602

(51) Int. Cl.
*B60T 11/236* (2006.01)
(52) U.S. Cl. ....................................................... 60/588
(58) Field of Classification Search ................... 60/562, 60/585, 588
See application file for complete search history.

(56) References Cited

U.S. PATENT DOCUMENTS

| 6,978,614 B2 | 12/2005 | Bourlon et al. |
| 7,401,468 B2 * | 7/2008 | Mouri et al. ................... 60/588 |
| 2004/0128995 A1 | 7/2004 | Bacardit et al. |

FOREIGN PATENT DOCUMENTS

EP 1479582 A1 11/2004

OTHER PUBLICATIONS

FR0703602 Search Report and Written Opinion.

* cited by examiner

*Primary Examiner* — Thomas E Lazo
(74) *Attorney, Agent, or Firm* — Michael Best & Friedrich LLP

(57) ABSTRACT

Brake master cylinder (10) for a motor vehicle, of the type which comprises a substantially axial body (12) inside a bore (14) of which at least one axial piston is slideably mounted, of the type in which the bore (14) comprises two seals, front (30, 34) and rear, interposed between the piston and the bore (14), the seals (30, 34) comprising three radially concentric lips accommodated in grooves (70, 72) in the bore (14), characterized in that front faces of the grooves (70, 72) are configured at least in part as a slope.

6 Claims, 2 Drawing Sheets

MASTER CYLINDER COMPRISING A RESUPPLY-PROMOTING SEAL

BACKGROUND AND SUMMARY OF THE INVENTION

The invention relates to a brake master cylinder for a motor vehicle.

The invention relates more particularly to a brake master cylinder for a motor vehicle, of the type which comprises a substantially axial body inside a bore of which is slideably mounted at least one axial piston which is capable of being actuated by a driver of the vehicle between a rear rest position and a forward braking force application position, and which is returned elastically toward its rear rest position, of the type in which the bore comprises two seals, front and rear, which are interposed between the piston and the bore, the front seal delimiting, in the bore, a rear supply chamber and a front pressure chamber, of the type in which the body comprises a radial supply duct which connects an external hydraulic fluid reservoir to the rear supply chamber and which opens out between the two seals, of the type in which the body comprises a braking circuit supply hole which opens into the front pressure chamber, of the type in which the piston comprises a bore, open to the front, communicating on the one hand with the front pressure chamber and on the other hand with the periphery of said piston by way of at least one hole which, when the piston occupies its rear rest position, is arranged between the two seals so as to open communication between the front pressure chamber and the rear supply chamber and which, when the piston is moved axially forward toward its application position, is capable of passing beyond the front seal so as to isolate the front pressure chamber from the rear supply chamber and thus allow a braking pressure to be established in the front pressure chamber, of the type in which at least each front seal is accommodated in a groove in the body of the master cylinder and comprises three concentric lips with an axial orientation, in particular: a first inner lip of which a free end is arranged in contact with the periphery of the piston, a second central lip of which the free end is arranged, in a rest position, in contact with a front face of the groove, and a third outer lip of which a free end is arranged, in a rest position, in contact with a peripheral bottom face of the groove, the second central lip and the third outer lip being capable, when the front pressure chamber is exposed to a partial vacuum caused by the return of the piston from its forward application position to its rest position or else by the activation of a trajectory control device forming part of the braking circuit, of separating from the front face and from the peripheral bottom face of the groove so as to allow the front pressure chamber to be resupplied by the reservoir.

Many examples of brake master cylinders of this type are known.

In most master cylinders of this type, the piston is generally guided in the bore by way of at least two annular bearing surfaces of the bore, these surfaces being respectively arranged in front of the front seal and to the rear of the rear seal.

The bearing surface which is arranged in front of the front seal adjoins the groove which accommodates the front seal and it comprises so-called resupply grooves which are intended to allow brake fluid to flow through these resupply grooves when the front pressure chamber is exposed to a partial vacuum caused by the return of the piston from its forward application position to its rest position or else when an "ESP"-type trajectory control device of the braking circuit is activated and generates a partial vacuum in the front pressure chamber.

The groove which accommodates the front seal generally comprises a straight transverse front face joined to a straight transverse rear face by way of a peripheral bottom wall. The second central lip and the third outer lip of the front seal have ends which are intended to adhere respectively to the straight transverse front face and to the peripheral bottom wall of the groove.

When the front seal is exposed to a partial vacuum, the ends of the second central lip and of the third outer lip of the front seal respectively separate from the straight transverse front face of the groove and from the peripheral bottom wall of the groove so as to respectively allow the reservoir to be resupplied by means of the front pressure chamber or else the front pressure chamber to be resupplied by the reservoir.

What has been found in many cases, however, is that the central lip and the third outer lip of the front seal separate only imperfectly from the front face of the groove and from the peripheral bottom wall of the groove. In that case, the brake fluid flow rate is insufficient for the resupply process to proceed correctly.

This is particularly evident when the vehicle is equipped with an "ESP"-type trajectory control device, in which case the demand for brake fluid, which is intended to supply one or more of the brake calipers of the vehicle, can be high even when the piston is occupying an application position in the pressure chamber. An insufficient flow rate can lead to a lack of efficiency, or at least to a detrimentally slow reaction of the "ESP"-type trajectory control device.

To overcome this drawback, the invention provides a brake master cylinder comprising means for increasing the resupply flow rate across the front seal.

To this end, the invention provides a brake master cylinder of the above-described type, characterized in that the front face of the groove is configured at least in part as a slope of defined inclination so as to facilitate the separation by tilting of the second central lip, in order to facilitate the separation by tilting of the third outer lip.

According to other features of the invention: one portion of the front face of the groove is configured as a continuous slope from the bore of the master cylinder body to an intermediate portion of said front face, and another portion of the front face of the groove has a radial orientation to the junction with its bottom peripheral wall; the front face of the groove is configured as a continuous slope over its full height; the slope forms a reduced angle with the radial direction so as to limit the axial displacement of the third outer lip as it tilts in order to limit the translational movement of the seal in the groove; the slope forms an angle of substantially 15 degrees with the radial direction; the master cylinder is of the tandem type and it comprises, in its substantially axial body, a bore inside which two axial pistons are slideably mounted, and two front seals which are accommodated in two grooves whose front faces are configured at least in part as a slope.

BRIEF DESCRIPTION OF THE DRAWINGS

Other features and advantages of the invention will become apparent on reading the detailed description below which will be understood by referring to the appended drawings, in which.

DETAILED DESCRIPTION

In the description which follows, identical reference numbers denote parts which are identical or have similar functions.

By convention, the terms "front", "forward" and "rear" respectively denote elements or positions respectively oriented toward the left and the right of the figures.

Figure 1:
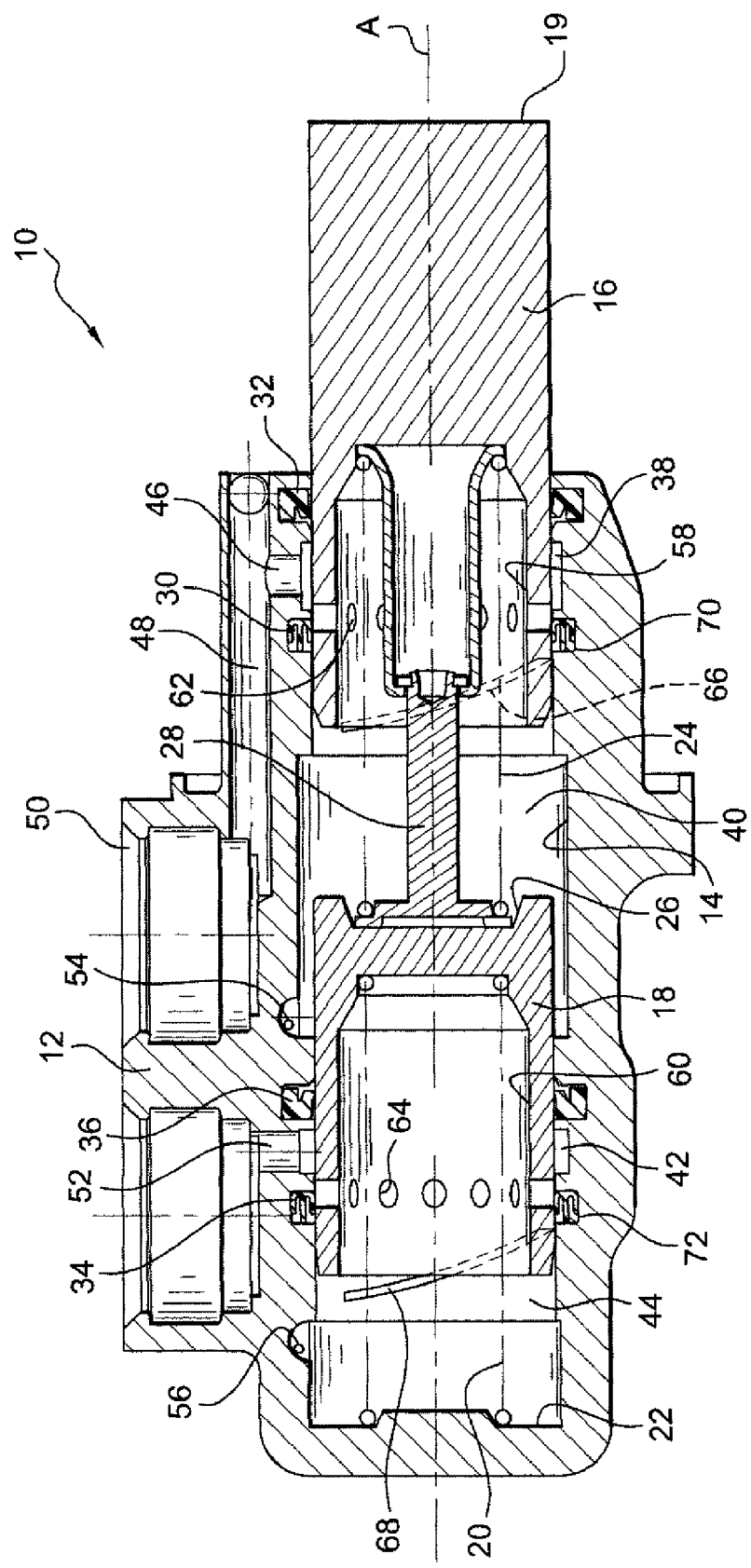
FIG. 1 is a view in axial section of a "tandem"-type master cylinder according to the invention.

FIG. 1 shows the whole assembly of a brake master cylinder 10 for a motor vehicle.

In a known manner, the master cylinder 10 comprises a substantially axial body 12, of axis "A", inside a bore 14 of which at least one axial piston is slideably mounted.

In the preferred embodiment of the invention, the master cylinder 10 is a "tandem"-type master cylinder which comprises a substantially axial body 12, of axis A, inside a bore 14 of which two axial pistons 16 and 18 are slideably mounted.

However, this configuration does not impose any limitation on the invention, and the master cylinder 10 could be a simple master cylinder having only one sliding piston.

The piston 16, termed primary piston 16, is intended to allow a hydraulic pressure to be established in a primary braking circuit (not shown) of the vehicle, and the piston 18, termed secondary piston 18, is intended to allow a hydraulic pressure to be established in a secondary braking circuit (not shown) of the vehicle that is independent of the primary braking circuit of the vehicle.

Each of these two circuits is associated with a trajectory control device which is capable of actuating vehicle braking components, such as brake calipers, independently of the master cylinder.

The primary piston 16 is capable of being actuated directly by a driver of the vehicle. For example, a rear end 19 of the primary piston 16 is capable of being connected to a booster (not shown) which amplifies the forces exerted on a brake pedal of the vehicle.

The secondary piston 18 is capable of being actuated indirectly by the driver of the vehicle, in particular by the primary piston 16.

Each primary 16 or secondary 18 piston is thus able to move between a rear rest position, which is represented in FIG. 1, and at least one forward braking force application position (not shown).

In a known manner, each primary 16 or secondary 18 piston is returned elastically toward its rear rest position, for example counter to an end stop (not shown).

In particular, the secondary piston 18 is returned toward the rear by a spring 20 which bears against a transverse front end face 22 of the bore 14 and against the secondary piston 18, and the primary piston 16 is returned elastically toward the rear by a spring 24 which bears against a transverse rear face 26 of the secondary piston 18 and against the primary piston 16. More specifically, since the spring 24 has a long length in particular, it is mounted around a sliding ram 28 which is interposed between the rear transverse face 26 of the secondary piston 18 and the primary piston 16.

The bore 14 comprises two primary seals, front 30 and rear 32, which are respectively interposed between the primary piston 16 and the bore 14, and two secondary seals, front 34 and rear 36, which are respectively interposed between the secondary piston 18 and the bore 14.

Consequently, the front primary seal 30 delimits, in the bore 14, a rear supply chamber 38 and a front pressure chamber 40. Similarly, the front secondary seal 34 delimits, in the bore 14, a rear supply chamber 42 and a front pressure chamber 44.

The body 12 comprises a primary radial supply duct 46 which connects a primary external hydraulic fluid reservoir (not shown) to the primary rear supply chamber 38 and which opens out between the two primary seals 30 and 32.

In particular, the primary radial supply duct 46 is, for example, connected by way of an intermediate longitudinal duct 48 to an orifice 50 which opens to the outside of the body 12 and which is intended to receive an outlet (not shown) of the associated primary reservoir.

The body 12 comprises a secondary radial supply duct 52 which connects a secondary external hydraulic fluid reservoir (not shown) to the secondary rear supply chamber 42 and which opens out between the two secondary seals 34 and 36.

The body further comprises two holes, primary 54 and secondary 56, for supplying the associated primary and secondary braking circuits, these holes opening into the associated primary 40 and secondary 44 front pressure chambers.

Among other embodiments known from the prior art, each piston 16, 18 comprises a bore 58, 60, open to the front, communicating on the one hand with the associated front pressure chamber 40, 44 and on the other hand with the periphery of said piston 16, 18 by way of at least one hole 62, 64 whose position with respect to the associated primary or secondary front seal 30, 34 determines the selective opening of communication between the primary and secondary rear supply chambers 38, 42 and the primary and secondary front pressure chambers 40, 44.

Thus, when the piston 16, 18 occupies its rear rest position shown in FIG. 1, the associated hole 62, 64 is arranged between the two primary 30, 32 and secondary 34, 36 seals so as to open communication between the front pressure chamber 40, 44 and the rear supply chamber 38, 42.

When the piston 16, 18 is moved axially forward toward its application position (not shown), the hole 62, 64 passes beyond the front seal 30, 34 so as to isolate the front pressure chamber 40, 44 from the rear supply chamber 38, 42, thereby establishing a braking pressure in each front pressure chamber 40, 44.

Moreover, as illustrated in FIG. 1, each front seal 30, 34 is accommodated in an associated groove 70, 72 in the body 12 of the master cylinder.

Figure 2:
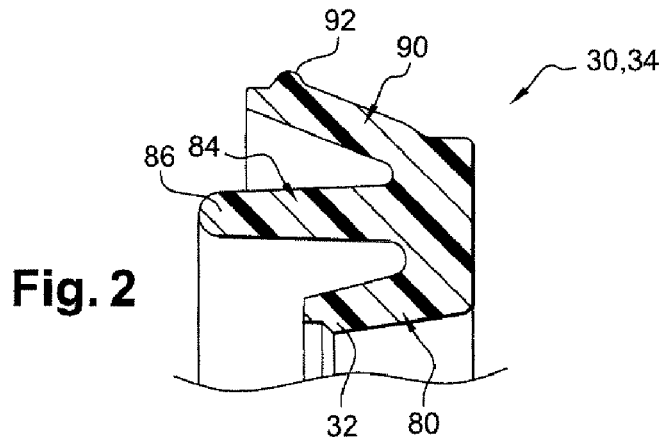
FIG. 2 is a half-view in axial section of a front seal prior to fitting it in the groove.

As illustrated in FIG. 2 and the following figures, each front seal 30, 34 has three concentric lips with an axial orientation, in particular: a first inner lip 80 of which a free end 82 is intended to be arranged in contact with the periphery of the piston 16, 18, a second central lip 84 of which the free end 86 is arranged, in a rest position, in contact with a front face of the groove 70, 72, and a third outer lip 90 of which a free end 92 is arranged, in a rest position, in contact with a peripheral bottom face 94 of the groove 70, 72.

When the piston 16, 18 returns from its forward application position to its rest position, or when a trajectory control device forming part of the braking circuit connected to the primary and secondary braking circuits is activated, a partial vacuum is generated in the primary and secondary front pressure chambers 40, 44 that causes the second central lip 84 and the third outer lip 90 to separate from the front face 88 and from the bottom peripheral face 84 of the groove 70, 72 so as to allow the front pressure chamber 40, 44 to be resupplied by the reservoir.

In an analogous manner, separation of the lips 84, 90 of the seals 30, 34 allows the primary and secondary front pressure chambers 40, 44 to be resupplied by the primary 46 and secondary 52 radial supply ducts, and hence by the associated reservoirs, when a trajectory control device of the braking circuit connected to the primary and secondary braking circuits is activated.

Moreover, resupply is made possible in front of the seals 30, 34 by a resupply groove 66, 68 which is formed, in the bore, in front of a groove 70, 72 which accommodates the front seal 30, 34.

Conventionally, the front face 88 of the groove 70, 72 is a straight transverse face.

What has been found in many cases, however, is that the central lip 84 and the third outer lip 90 of the front seals 30, 34 separate only imperfectly from the front face 88 of the groove 70, 72 and from the peripheral bottom wall of the groove. In that case, the brake fluid flow rate is insufficient for the resupply process to proceed correctly.

To overcome this drawback, the invention provides a groove 70, 72 of suitable profile.

To this end, and according to the invention, the front face 88 of the groove 71, 72 is configured at least in part as a slope of defined inclination "α" so as to facilitate the separation by tilting of the second central lip 84, in order to facilitate the separation by tilting of the third outer lip 90.

Figures 3, 4:
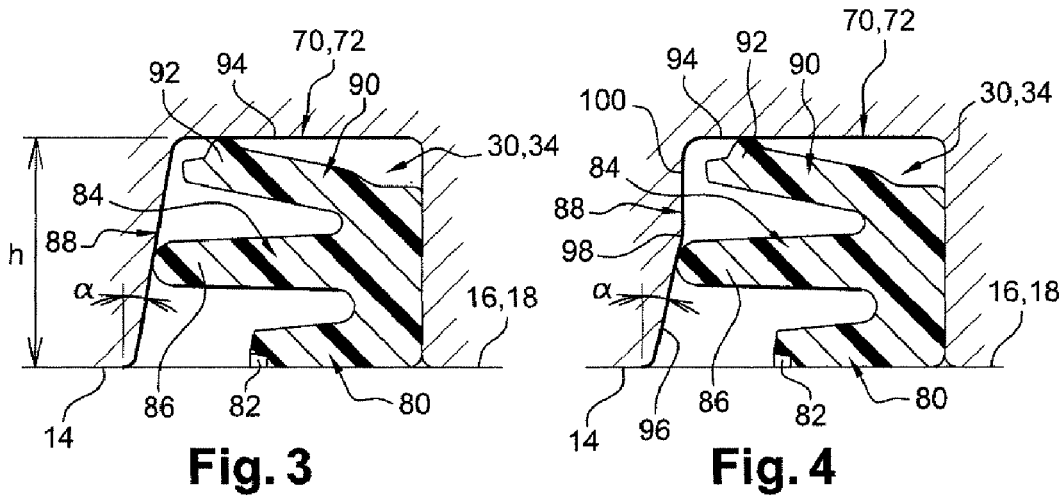
FIG. 3 is a half-view in axial section of a seal fitted in a groove according to a second embodiment of the invention and represented in a rest position.
FIG. 4 is a half-view in axial section of a seal fitted in a groove according to a first embodiment of the invention and represented in a rest position.
Figures 5, 6:
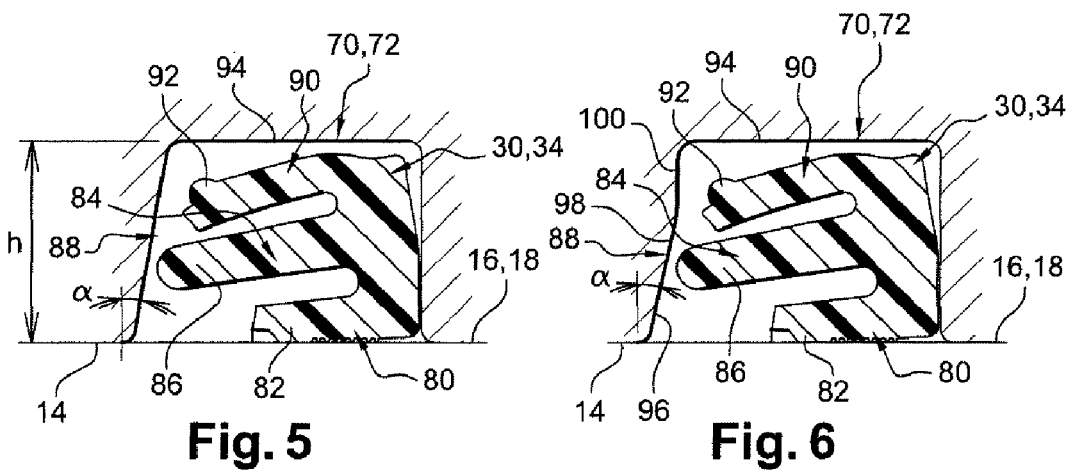
FIG. 5 is a half-view in axial section of the seal shown in FIG. 3 represented in a position of separation.
FIG. 6 is a half-view in axial section of the seal shown in FIG. 4 represented in a position of separation.

According to a first embodiment, which has been shown in FIGS. 4 and 6, one portion 96 of the front face 88 of the groove 70, 72 is configured as a continuous slope from the bore 14 of the master cylinder body 12 to an intermediate portion 98 of said front face, and another portion 100 of the front face of the groove 70, 72 has a radial orientation to the junction with its bottom peripheral wall.

In this configuration, the end 86 of the central lip 84 is arranged, at rest, substantially at the intermediate junction portion 98 of the two portions 96, 100, as represented in FIG. 4, and separates from the front face 88 when a partial vacuum is established, as represented in FIG. 6. The tilting movement of the central lip 84 causes a deformation in the seals 30, 34, the effect of which is to cause a tilting movement of the outer lip 90 whose end 92 separates from the peripheral bottom wall 94, as represented in FIG. 6.

According to a second embodiment of the invention, which has been shown in FIGS. 3 and 5, the front face 88 of the groove 70, 72 is configured as a continuous slope over its full height "h".

In this embodiment, the slope preferably forms a reduced angle "α" with the radial direction so as to limit the axial displacement of the third outer lip 90 as it tilts in order to limit the translational movement of the seal 30, 34 in the groove 70, 72.

To this end, the slope preferably forms an angle "α" of substantially 15 degrees with the radial direction.

It will be understood that the invention is not limited to a master cylinder 10 having only one piston, but can essentially be applied to a tandem-type master cylinder 10 which comprises, in its substantially axial body 12, a bore 14 inside which two axial pistons 16, 18 are slideably mounted, and two front seals 30, 34 which are accommodated in two grooves 70, 72 whose front faces 88 are configured at least in part as a slope.

The invention thus makes it possible to have a master cylinder whereby the associated braking circuits can be resupplied rapidly.

The invention claimed is:

1. Brake master cylinder (10) for a motor vehicle, of the type which comprises a substantially axial body (12) inside a bore (14) of which is slideably mounted at least one axial piston (16, 18) which is capable of being actuated by a driver of the vehicle between a rear rest position and a forward braking force application position, and which is returned elastically toward its rear rest position, of the type in which the bore (14) comprises two seals, front (30, 34) and rear (32, 36), which are interposed between the piston (16, 18) and the bore (14), the front seal (30, 34) delimiting, in the bore (14), a rear supply chamber (38, 42) and a front pressure chamber (40, 44), of the type in which the body (12) comprises a radial supply duct (46, 52) which connects an external hydraulic fluid reservoir to the rear supply chamber (38, 42) and which opens out between the two seals (30, 32, 34, 36), of the type in which the body (12) comprises a braking circuit supply hole (54, 56) which opens into the front pressure chamber (40, 44), of the type in which the piston comprises a bore (58, 60), open to the front, communicating on the one hand with the front pressure chamber (40, 44) and on the other hand with the periphery of said piston (16, 18) by way of at least one hole (62, 64) which, when the piston (16, 18) occupies its rear rest position, is arranged between the two seals (30, 32, 34, 36) so as to open communication between the front pressure chamber (40, 44) and the rear supply chamber (38, 42) and which, when the piston (16, 18) is moved axially forward toward its application position, is capable of passing beyond the front seal (30, 34) so as to isolate the front pressure chamber (40, 44) from the rear supply chamber (38, 42) and thus allow a braking pressure to be established in the front pressure chamber (40, 44), of the type in which at least each front seal (30, 34) is accommodated in a groove (70, 72) in the body of the master cylinder and comprises three concentric lips with an axial orientation, in particular: a first inner lip (80) of which a free end (82) is arranged in contact with the periphery of the piston (16, 18), a second central lip (84) of which the free end (86) is arranged, in a rest position, in contact with a front face (88) of the groove (70, 72), and a third outer lip (80) of which a free end (92) is arranged, in a rest position, in contact with a peripheral bottom face (94) of the groove (70, 72), the second central lip (84) and the third outer lip (90) being capable, when the front pressure chamber (40, 44) is exposed to a partial vacuum caused by the return of the piston (16, 18) from its forward application position to its rest position or else by the activation of a trajectory control device forming part of the braking circuit, of separating from the front face (88) and from the peripheral bottom face (94) of the groove (70, 72) so as to allow the front pressure chamber (40, 44) to be resupplied by the reservoir, characterized in that the front face (88) of the groove is configured at least in part as a slope of defined inclination (α) so as to facilitate the separation by tilting of the second central lip (84), in order to facilitate the separation by tilting of the third outer lip (90).

2. Master cylinder (10) according to claim 1, characterized in that one portion (96) of the front face (88) of the groove (71, 72) is configured as a continuous slope from the bore (14) of the master cylinder body to an intermediate portion (98) of said front face (88), and in that another portion (100) of the front face (88) of the groove (70, 72) has a radial orientation to the junction with its bottom peripheral wall (94).

3. Master cylinder (10) according to claim 1, characterized in that the front face (88) of the groove is configured as a continuous slope over its full height (h).

4. Master cylinder (10) according to claim 3, characterized in that the slope forms a reduced angle (α) with the radial direction so as to limit the axial displacement of the third outer lip (90) as it tilts in order to limit the translational movement of the seal (30, 34) in the groove (70, 72).

5. Master cylinder (10) according to claim 4, characterized in that the slope forms an angle ($\alpha$) of substantially 15 degrees with the radial direction.

6. Master cylinder (10) according to claim 1, characterized in that it is of the tandem type and comprises, in its substantially axial body (12), a bore inside which two axial pistons (16, 18) are slideably mounted, and two front seals (30, 34) which are accommodated in two grooves (70, 72) whose front faces (88) are configured at least in part as a slope.

* * * * *